April 22, 1924.
T. W. MEIKLEJOHN
TRACTOR ATTACHMENT
Filed May 12, 1920
1,491,053
3 Sheets-Sheet 1
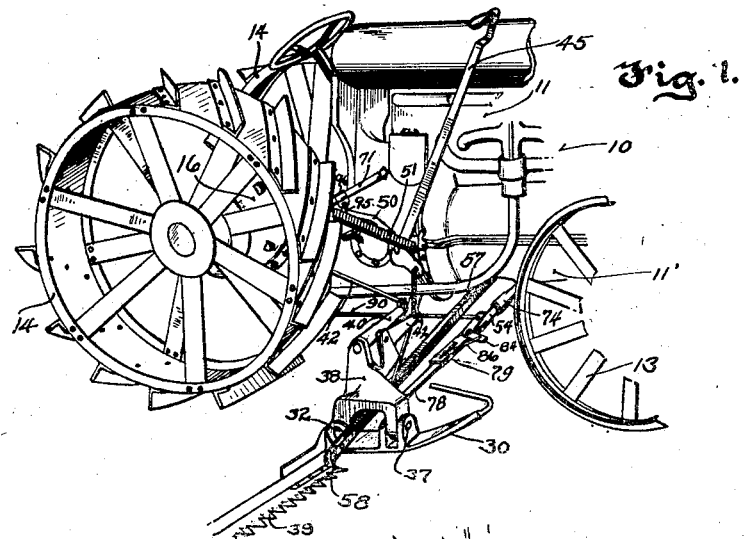
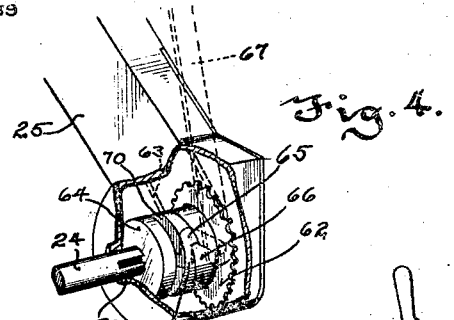
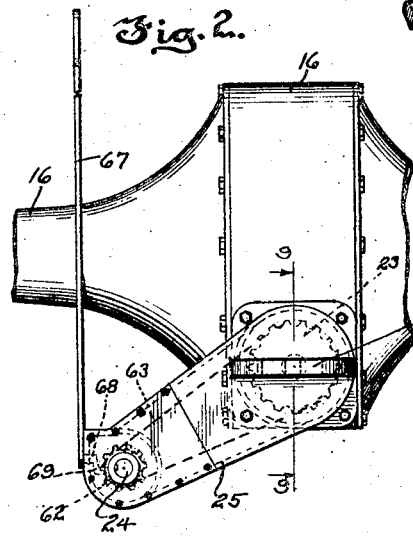
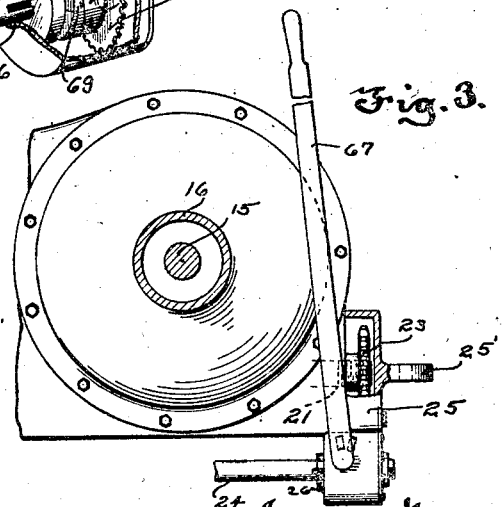

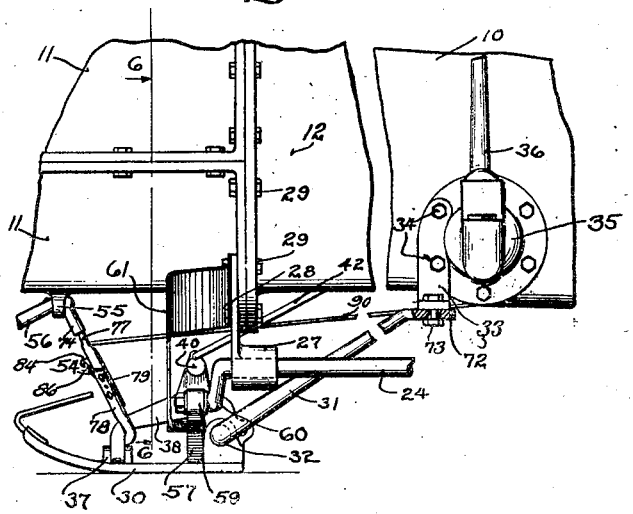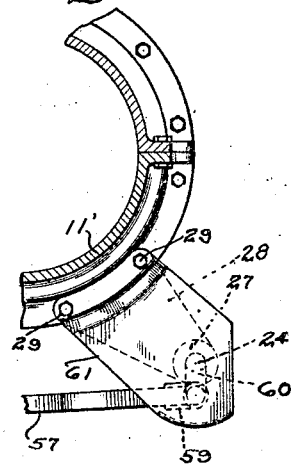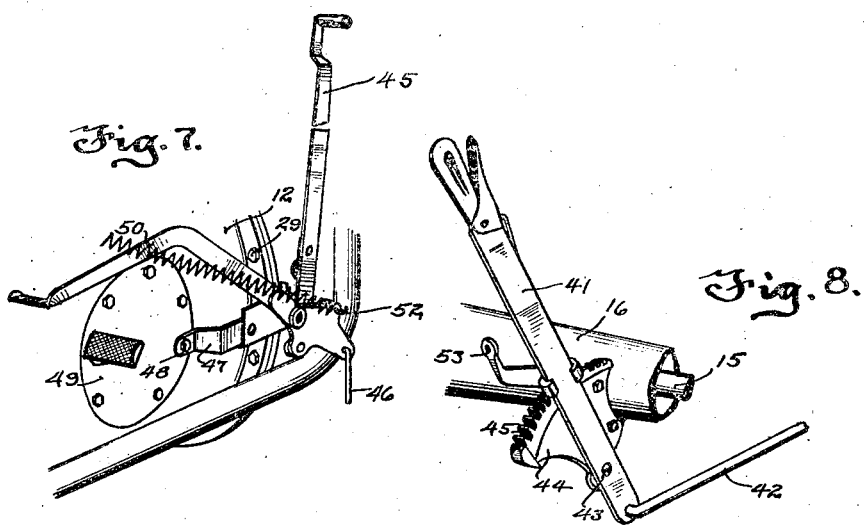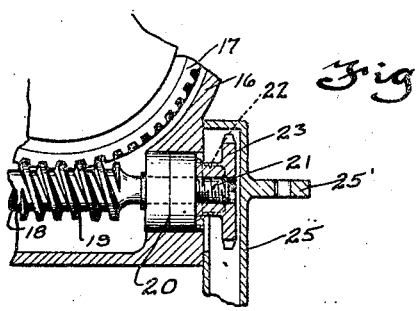

April 22, 1924.
T. W. MEIKLEJOHN
1,491,053
TRACTOR ATTACHMENT
Filed May 12, 1920
3 Sheets-Sheet 3
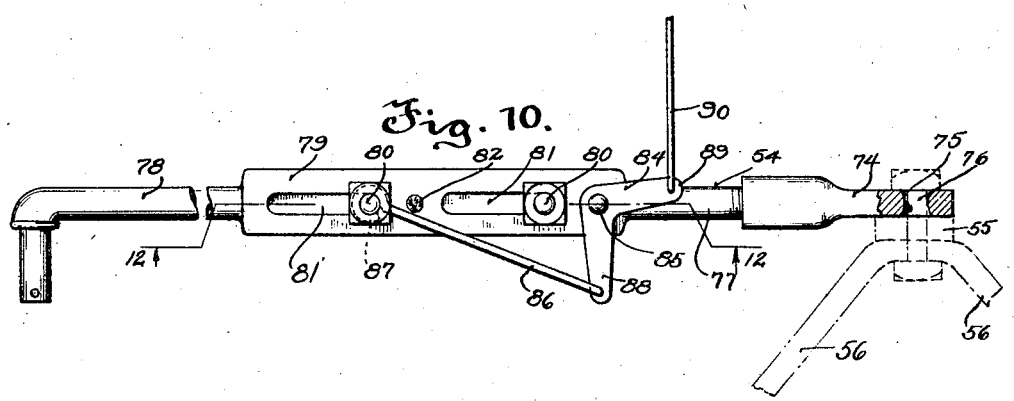
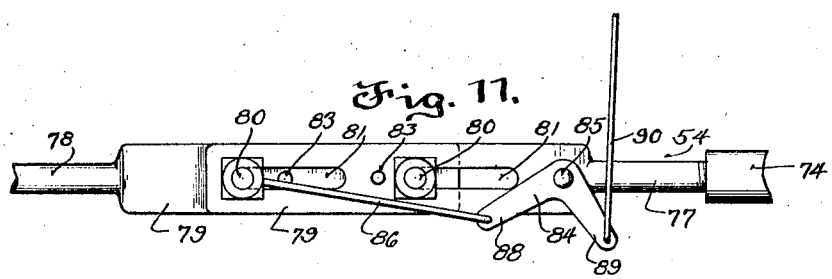
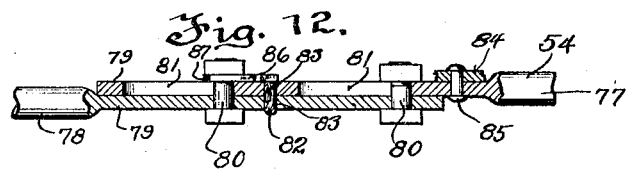
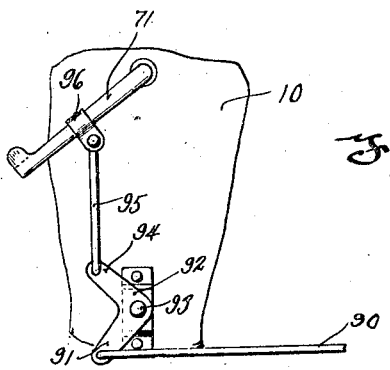
INVENTOR.
Thomas W. Meiklejohn.
BY Morsell + Keeney
ATTORNEYS.

Patented Apr. 22, 1924.

1,491,053

UNITED STATES PATENT OFFICE.

THOMAS W. MEIKLEJOHN, OF FOND DU LAC, WISCONSIN.

TRACTOR ATTACHMENT.

Application filed May 12, 1920. Serial No. 380,905.

*To all whom it may concern:*

Be it known that I, THOMAS W. MEIKLEJOHN, a citizen of the United States, and resident of Fond du Lac, in the county of Fond du Lac and State of Wisconsin, have invented new and useful Improvements in Tractor Attachments, of which the following is a description, reference being had to the accompanying drawings, which are a part of this specification.

The present invention relates to certain new and useful improvements in tractors and refers more particularly to attachments for tractors of the power driven type.

It is the present custom to couple various implement attachments to tractors to take the power from the tractor power plant before this power was delivered to the tractor wheels. This construction gives absolutely no control over the speed of the implement attachment if the tractor happens to be in the hands of a careless operator.

Hence this invention has for one of its objects to provide an implement attachment for tractors connected with the power plant thereof at a point so that the attachment will be run at the wheel speed of the tractor irrespective of its engine speed.

Another feature common to the present mode of connecting implement attachments to tractors, is that when the tractor motor is allowed to race or run with a wide open throttle, the excess of speed is apt to damage the mechanism.

Hence my invention has for another of its objects to provide an implement attachment and means for connecting the same with the tractor power plant so that when the tractor is at a standstill with the engine running, the implement attachment will also be at a standstill.

A further object of this invention is to provide means for attaching various kinds of implements to a tractor by connecting them to the differential worm or drive shaft without interferring with the drive of the tractor.

A further object of my invention is to provide means for preventing the breaking of the tractor attachment when the same strikes some obstacle in its path.

A still further object of this invention is to provide a connection between the tractor attachment and the tractor controls whereby the controls will be rendered inoperative upon the attachment striking some obstacle in its path, thus preventing the tearing of the attachment from the tractor.

A more specific object of this invention is to provide a mowing machine attachment for a tractor, which is capable of ready adjustment to various positions and which may be readily removed from or secured to the tractor with ease or facility.

With the above and other objects in view which will appear as the description proceeds, my invention resides in the novel construction, combination and arrangement of parts substantially as hereinafter described and more particularly defined by the appended claims, it being understood that such changes in the precise embodiment of the herein disclosed invention may be made as come within the scope of the claims.

In the accompanying drawings I have illustrated one complete example of the physical embodiment of my invention constructed according to the best mode I have so far devised for the practical application of the principles thereof, and in which:

Figure 1 is a perspective view of a portion of a tractor equipped with a mowing machine attachment embodying the features of my invention;

Figure 2 is a rear elevation of a portion of the tractor differential illustrating the manner of coupling the implement drive shaft with the tractor differential worm;

Figure 3 is a view partly in section and partly in elevation looking at the differential from one end;

Figure 4 is a fragmentary perspective view with parts broken away and in section illustrating the improved form of clutch means employed to connect the implement drive shaft with the differential worm;

Figure 5 is a fragmentary view of the lower part of a tractor illustrating the manner of securing the attachment to the tractor and connecting the same with the implement drive shaft;

Figure 6 is a detailed view part in section and part in elevation taken on the plane indicated by the line 6—6 of Figure 5;

Figure 7 is a perspective view of a portion of the transmission housing of the tractor and the levers secured thereto and connected with the mowing machine attachment for raising the mower to upright inoperative position;

Figure 8 is a perspective view of a portion of the rear differential housing and the operating lever secured thereto and connected with the mowing machine attachment for tiltably adjusting the cutter;

Figure 9 is a fragmentary view part in section and part in elevation taken on the plane indicated by the line 9—9 of Figure 2;

Figure 10 is a view of the improved form of forward brace rod I employ for rendering the tractor controls inoperative when the attachment strikes an obstacle in its path, said rod being detached from the tractor and having parts broken away and in section;

Figure 11 is a fragmentary view of the extensible brace rod with the parts thereof in extended position;

Figure 12 is a sectional view taken longitudinally through the center thereof on the line 12—12 of Figure 10, and Figure 13 is a side view of a portion of a tractor where the control pedal is connected with my extensible brace rod.

Referring now more particularly to the accompanying drawings, the numeral 10 designates generally a tractor, which may be of any desired make or construction.

The tractor consists, in brief, of an engine or power plant 11 having a transmission enclosed within a transmission housing 12 and supported by front and rear wheels 13 and 14, respectively. The rear or bull wheels are fixed to the outer ends of a two part rear axle 15 enclosed within a differential housing 16 and having the inner ends of the sections thereof connected with a differential mechanism including a master worm wheel 17. Driven from the transmission within the housing 12 is a worm shaft 18 having a worm 19 formed thereon in mesh with the worm wheel 17 and having its rear end portion journalled in an end thrust bearing 20 with its rear end threaded and projected slightly rearwardly thereof, as at 21.

This threaded end 21 is normally engaged with a worm nut 22, see dotted lines Figure 9, when the tractor leaves the factory, and this end 21 and worm nut 22 is enclosed by means of a draw bar cap, not shown. In the present invention the draw bar cap is removed and the worm nut 22 replaced by a sprocket wheel 23, which is connected, by means to be later described, with an implement drive shaft 24. The place of the other draw bar cap is taken by a guard housing 25 which is inclined downwardly and to one side and provided with a bearing member 26 in which one end of the shaft 24 is journalled, the other end of said shaft being journalled in a bearing 27 formed on one end of a bracket 28 secured in place by several of the usual bolts or fastening members 29 used in connecting the transmission housing 12 with the engine crank case 11'.

In the present instance I have illustrated my invention in connection with a mowing machine attachment which consists of a shoe 30 normally arranged to travel along the ground adjacent the side of the tractor opposite the drive shaft 24 and the same is connected and braced with respect to the tractor by means of a bracing rod 31. The rod 31 has its lower end pivotally connected to the shoe as at 32 and its upper end secured to a bracket member 33 attached to the transmission housing 10 by fastening bolts 34 which also serve to secure the attaching plate 35 for maintaining the gear shift lever 36 in position.

The lever 41 is pivotally connected as at 43 to a quadrant 44 secured to the rear differential housing 16 in any desired manner. This lever is readily releasably retained in any desired adjusted position by a pawl, not shown, which is engageable with any one of the teeth 45 of the quadrant. The entire mowing attachment is capable of being raised to a vertical position adjacent the tractor side by a lever 45 connected with the attachment by links 46, all of which may be of well known construction and therefore further description thereof is deemed unnecessary.

The lever 45 is pivotally carried by a bracket 47 secured in position by certain of the bolts 29, and bolts 48 which secure a plate 49 in position. A foot lever 50 is also pivotally carried by the bracket 47 for giving an initial raising movement to the mower and which is assisted by means of a spring 51 having one end connected, as at 52, to a part of lever 50 and its other end connected to a bracket arm 53 secured to the quadrant 44, see Figures 1, 7 and 8. The mowing machine attachment is further braced and secured to the tractor by means of a rod of special construction, as later described, and which has one end connected with the yoke 38 and its other end secured, as at 55, to the underside of the crank case 11' adjacent the inner end of the usual radius rod 56.

The cutting blade 39 is connected with the drive shaft 24 by means of a relatively long pitman or connecting rod 57 which passes across the tractor beneath the engine thereof. One end of the pitman rod is connected, as at 58, with the cutting blade 39 and its other end 59 is pivotally connected with a crank arm 60 formed on the forward end of the shaft 24. This construction insures the smooth working of the mower without excessive vibration by reason of the great length of the pitman and, due to the great leverage obtained thereby, the connecting rod is prevented from becoming locked on dead centers.

The forward cranked end of the shaft 24 is protected by means of a weed guard 61 which completely covers the sweep of the crank arm 60 and has its upper end secured in position by the bolts 29 securing the bearing bracket 28 in position. The weed guard may be formed from sheet metal and serves merely to deflect weeds or other foreign matter to one side out of the sweep of the crank arm 60. The connection between the drive shaft 24 and the drive worm shaft 18 consists of a sprocket wheel 62, preferably of one-half the diameter of the sprocket wheel 23 fixed to the end 21 of shaft 18, freely journalled upon the portion of the shaft 24 enclosed within the housing 25 and connected with the sprocket 23 in any desired manner, in the present instance a sprocket chain 63 being employed.

The wheel 62 is connectable with the shaft 24 by a clutch member 64 slidably but non-rotatably secured on said shaft within the housing 25 and having a clutch face 65 engageable with a clutch face 66 formed on the hub of the wheel 62. The clutch member 64 is moved to and from engagement with the clutch face 66 of the wheel 62 by a hand lever 67 having its lowermost end secured to the outer end of a stub shaft 68 journalled in the end of housing 25 and having a crank 69 formed on its end disposed within the housing and engaged within an annular groove 70 formed in the clutch 64. As will be obvious, a movement of the lever 67 to the left, with reference to Figures 3 and 4, will engage the clutch faces 65 and 66 and the wheel 62 made substantially rigid with the shaft 24, and a reverse movement of said lever will disengage the clutch faces and permit the free rotation of the wheel 62 upon its shaft.

The present invention contemplates the drive from the differential worm so that the speed of the implement will always be in proportion with the wheel speed of the tractor.

The housing 25 is also provided with the coupling member 25' to take the place of the one formed on the draw bar cap disposed by said housing. As will be readily obvious to those skilled in the art to which an invention of this character appertains, the attachment may be readily secured or removed from the tractor with ease and facility.

Oftentimes, when a mower is in use, the cutting blade strikes some obstacle in the field, such as an old tree stump, stone, or the like, as a result of which the attachment is torn from the tractor before the operator is aware of it, unless he is unusually attentive to his work. Even though the operator may be giving close attention to his work, the attachment may strike some obstacle in its path and be broken before he can work his controls. Hence another important object of my invention is to so connect the attachment to, and brace the same with, the tractor as to prevent damage to the attachment when the same strikes some obstacle in its path.

This object of my invention is obtained by so connecting the mower or other attachment with the tractor as to permit a limited rearward movement of the mower under stress without damage thereto and at the same time providing means connected with the clutch pedal 71 for throwing the clutch (not shown) out to render the tractor drive inoperative. Due to the rough and soft character of the ground over which the tractor is generally driven, its momentum is soon arrested upon the throwing out of the clutch and damage to the attachment prevented.

The limited rearward movement of the attachment under stress is permitted by the improved manner of connecting the upper ends of the brace rods 31 and 54 so that the same may have a substantially swivel movement. As best shown in Fig. 5, the upper end 72 of the rod 31 has the aperture through which the bolt 73 passes flared and as depicted in Fig. 10, the upper end 74 of the rod 54 has the aperture 75 through which bolt 76 passes correspondingly flared.

The rod 54 is formed of an upper section 77 and a lower section 78, both having their inner ends 79 flattened and slidably connected together by bolts 80 carried by the inner end of one section and passed through elongated slots 81 in the inner end of the other section. This construction permits the extension of the rod a distance equal to the length of the slots 81, and the rod is normally held in contracted or shortened position by a breakable pin 82 positioned in openings 83 which are in register when the rod is contracted, see Figs. 10 and 12.

The pin 82 is preferably of wood or any other suitable material and of a size sufficient to withstand the usual strain, but insufficient to stand any excess strain, as when the mower or other attachment strikes some obstacle in its path. As before stated, the rod 54 is so connected with the clutch pedal 71, that, when the same is extended, the clutch will be thrown out and the tractor drive rendered inoperative, as will now be described.

The outer end of the flattened portion 79 of the rod section that is slotted has a bell crank lever 84 pivoted thereto, as at 85, which is connected with the other rod section by a link 86 having one end pivotally secured to one of the bolts 80, as at 87, and its other end pivotally connected to one arm 88 of the bell crank lever 84.

The other arm 89 of the lever 84 is connected by a rod 90 with one arm 91 of a second bell crank lever 92 pivotally secured, as at 93, to the transmission casing 10, adjacent the clutch pedal 71. The arm 94 of the lever 92 is connected with the clutch pedal 71 by a link 95 having its outer end pivotally secured to a clamp member 96 carried by the clutch pedal, see Fig. 13.

From the foregoing description taken in connection with the accompanying drawings, it will be readily apparent that upon some obstacle preventing the operation or forward movement of the mower the attachment will be forced rearwardly, breaking the pin 82, extending rod 54 and throwing out the clutch 71, rendering the tractor drive inoperative and bringing the tractor to a stop.

What I claim as my invention is:

1. The combination with a tractor and its power plant and drive connection between the tractor wheels and said plant including a worm wheel and worm driven shaft operated at all times at the same speed relative to the speed of the tractor wheels, of an implement easily detachably carried by the tractor, a drive shaft for the implement for driving said implement at the same speed as the tractor wheels, means drivingly connecting the driven shaft with said drive shaft, a guard housing for said means, and clutch means enclosed within said guard housing for rendering the means connecting the driven shaft with the drive shaft inoperative.

2. The combination with a tractor and its power plant and drive connection between the tractor wheels and said plant including a driven shaft operated at all times at the same speed relative to the speed of the tractor wheels, of an implement easily detachably carried by the tractor, a drive shaft for the implement, a sprocket wheel fixed to said driven shaft, a second sprocket wheel freely journaled on said drive shaft, a sprocket chain trained about said sprocket wheels, clutch means for detachably connecting the second sprocket wheel rigid with said drive shaft, and guard means for said sprocket wheels and chain.

3. The combination with a power driven tractor and a drive control therefor, of an implement attachment carried by the tractor, and breakable means connectable with the tractor drive control for rendering the same inoperative upon a rearwardly and horizontal movement of the outer end of the implement from its normal position under stress.

4. The combination with a power driven tractor, of an attachment carried thereby, a two part brace rod connecting the attachment with the tractor, breakable means normally holding the parts of said rod substantially rigid with respect to each other, said brace rod parts being movable with respect to each other upon the stress thereon reaching a predetermined amount, and means for rendering the drive of the tractor inoperative upon a relative movement of the parts of said rod with respect to each other.

5. The combination with a power driven motor, a drive control therefor and an implement carried thereby, of a rod for connecting the attachment with the tractor and including two slidably connected parts, said rod parts being movable with respect to each other upon the attachment engaging an obstacle in its path, substantially rigid but breakable means for securing said rod parts from movement with respect to each other, said means being rendered inoperative upon the stress on said rod reaching a predetermined amount sufficient to break the rigid means, and means connected with the tractor control for rendering the same inoperative when said rod parts are moved with respect to each other.

6. The combination with a power driven tractor, its drive controls and an implement attachment carried thereby, of a two part brace extensible rod connecting the attachment and tractor, the parts of the rod being connected together and capable of a limited movement with respect to each other, breakable means normally retaining the parts in contracted position, and means connected with the drive controls for rendering the tractor drive inoperative upon the extension of said rod parts.

7. The combination with a power driven tractor, its drive controls and an implement attachment carried thereby, of a two part brace extensible rod connecting the attachment and tractor, the parts of the rod being connected together and capable of a limited movement with respect to each other, means normally retaining the parts in contracted position, a bell crank lever pivotally mounted on one rod part, a connection between one arm of said lever and the other rod part whereby the movement of the rod parts to extended position will rock the bell crank lever on its pivot, and means connecting the other arm of said lever with the tractor drive controls for rendering the same inoperative upon the extension of said rod.

8. The combination with a power driven motor, a drive control therefor and an implement carried thereby, of a rod for connecting the attachment with the tractor and including two slidably connected parts, said rod parts being movable with respect to each other upon the attachment engaging an obstacle in its path, non-yieldable means for normally securing said rod parts against movement with respect to each other, said means being breakable and rendered inoperative upon the stress on said rod reaching a predetermined amount, and means connected with the tractor control for rendering the same inoperative upon a movement of said rod parts under stress.

9. The combination with a power driven tractor, a drive control therefor and an implement attachment carried thereby, of a brace rod connected with the attachment and tractor and including two parts movable relatively to each other, each rod part having an aperture therein adapted to register with the aperture of the other part when said parts are in normal position, a pin engageable with said alined apertures to restrain said rod parts from movement with respect to each other, said pin being breakable upon the stress on said rod reaching a predetermined amount, and means connected with the drive control of the tractor to render the same inoperative when said pin is broken and the rod parts moved with respect to each other.

In testimony whereof, I affix my signature.

THOMAS W. MEIKLEJOHN